(12) United States Patent
Pfeifer

(10) Patent No.: US 12,377,924 B1
(45) Date of Patent: Aug. 5, 2025

(54) ANTI-NOSEDIVE LEG LIFT ASSIST ASSEMBLY

(71) Applicant: Mickey Truck Bodies Inc., High Point, NC (US)

(72) Inventor: Nicholas L. Pfeifer, Jamestown, NC (US)

(73) Assignee: Mickey Truck Bodies Inc., High Point, NC (US)

( * ) Notice: Subject to any disclaimer, the term of this patent is extended or adjusted under 35 U.S.C. 154(b) by 821 days.

(21) Appl. No.: 17/590,651

(22) Filed: Feb. 1, 2022

(51) Int. Cl.
  *B62D 63/08* (2006.01)
  *B60D 1/66* (2006.01)
  *B60S 9/04* (2006.01)

(52) U.S. Cl.
  CPC ............... *B62D 63/08* (2013.01); *B60D 1/66* (2013.01); *B60S 9/04* (2013.01)

(58) Field of Classification Search
  CPC .......... B62D 63/08; B62D 63/06; B60D 1/66; B60S 9/04; B60S 9/02
  See application file for complete search history.

(56) References Cited

U.S. PATENT DOCUMENTS

| | | | | |
|---|---|---|---|---|
| 1,727,430 A * | 9/1929 | Gilkison | .................... | B60S 9/02 280/763.1 |
| 2,162,181 A * | 6/1939 | Skinner | ..................... | B60S 9/04 248/354.1 |
| 2,388,308 A * | 11/1945 | Court | ....................... | B60D 1/66 248/354.3 |
| 3,822,798 A * | 7/1974 | Neff | .......................... | B60P 3/06 296/168 |
| 4,921,269 A * | 5/1990 | Scully | ....................... | B60S 9/04 280/475 |
| 5,538,225 A * | 7/1996 | VanDenberg | ........... | F16H 63/30 254/419 |
| 6,726,247 B1 * | 4/2004 | Snyder | ...................... | B60S 9/04 280/765.1 |
| 6,846,016 B2 * | 1/2005 | VanDenberg | ............. | B60S 9/08 254/419 |
| 7,398,959 B2 * | 7/2008 | VanDenberg | ............. | B60S 9/08 254/419 |
| 8,528,929 B2 * | 9/2013 | Kimener | .............. | B65G 69/003 280/476.1 |
| 9,611,109 B2 * | 4/2017 | Kimener | .............. | B65G 69/006 |
| 11,697,440 B2 * | 7/2023 | Kucera | .................. | B60D 1/145 280/475 |
| 12,017,709 B2 * | 6/2024 | Kimener | .................. | B60D 1/66 |
| 2019/0256059 A1 * | 8/2019 | Ruppert | .................... | B60S 9/04 |

(Continued)

*Primary Examiner* — Valentin Neacsu
*Assistant Examiner* — Michael R Stabley
(74) *Attorney, Agent, or Firm* — Nelson Mullins Riley & Scarborough LLP

(57) ABSTRACT

A system for providing an easy to lift anti-nosedive leg is provided. The system includes an anti-nosedive leg and a lift assist assembly. The lift assist assembly includes a counterbalance assembly, and a cable having a first position and a second position. The first position of the cable is connected to the counterbalance assembly, and the second position of the cable is connected to the anti-nosedive leg. The counterbalance assembly is configured to generate tension within the cable to generate an upward force on the anti-nosedive leg. The lift assist assembly may be configured to reduce a force required by an operator to lift the anti-nosedive leg to fifty pounds or less.

18 Claims, 11 Drawing Sheets

(56) References Cited

U.S. PATENT DOCUMENTS

| | | | |
|---|---|---|---|
| 2021/0094373 A1* | 4/2021 | Di Biase | B60S 9/02 |
| 2021/0283963 A1* | 9/2021 | Di Biase | B60S 9/04 |
| 2022/0017125 A1* | 1/2022 | Kucera | B60D 1/07 |
| 2023/0286600 A1* | 9/2023 | Kimener | B60D 1/66 |

* cited by examiner

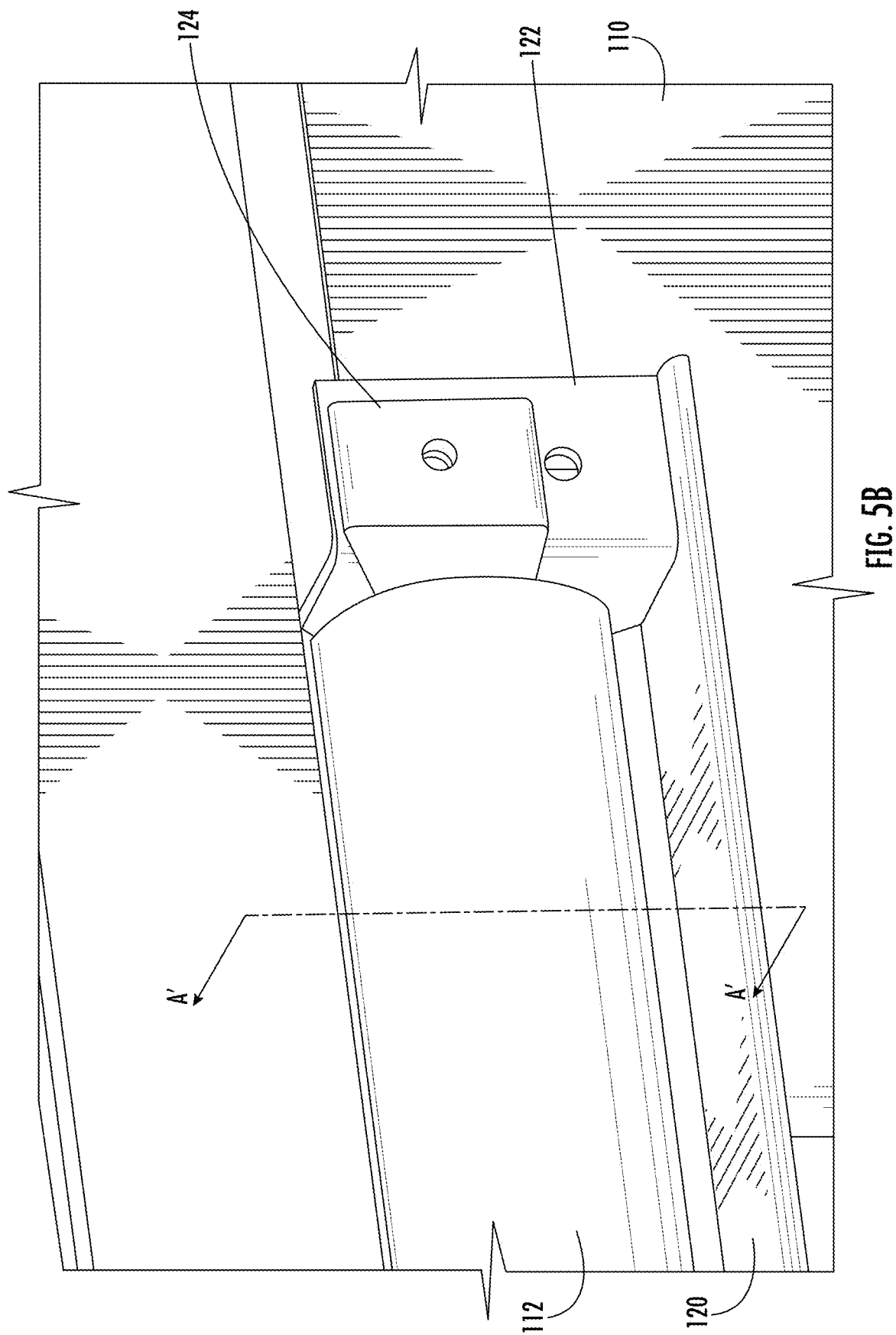

ANTI-NOSEDIVE LEG LIFT ASSIST ASSEMBLY

FIELD OF THE INVENTION

The present invention relates to a lift assist assembly for lifting an anti-nosedive device.

BACKGROUND OF THE INVENTION

Many freight trailers have a device attached to the front wall called an anti-nosedive leg. This anti-nosedive leg is like a kickstand on the front of the trailer to prevent it from tipping over. This anti-nosedive leg is often used when the trailer is being loaded by a forklift while not attached to a tractor. The anti-nosedive leg is made from heavy steel so that it is strong enough to withstand the potential forces that might be loaded on to it. As a result, the force required to manually lower or lift this anti-nosedive leg can be up to 100 pounds. This anti-nosedive leg has always been lowered and lifted by hand, and manual lifting of the anti-nosedive leg often required two or more people working together to raise the anti-nosedive leg.

SUMMARY OF THE INVENTION

Various embodiments included herein provide a device that is configured to reduce the amount of force required to raise and lower an anti-nosedive leg. In some embodiments, the force required to lift the anti-nosedive leg may be cut approximately in half. By reducing the force required, the risk of injury may be significantly reduced, and the device may be simpler to install and use.

As noted above, anti-nosedive legs have always been lowered and lifted by hand, and the force required to do manually lower or lift this anti-nosedive leg may be up to 100 pounds. Thus, these anti-nosedive legs are often very heavy and may cause injury when raising or lowering them. By reducing the amount of force required to raise and lower an anti-nosedive leg, the likelihood of injury may be drastically reduced and the anti-nosedive leg may often be operated more efficiently. Due to the heavy weight of the anti-nosedive leg, manual lifting of the anti-nosedive leg often required two or more people working together to raise the anti-nosedive leg. By reducing the amount of force required to raise and lower an anti-nosedive leg, the anti-nosedive leg may be safely and easily raised and lowered by just one person. This may be beneficial because the driver will typically be the only person in the truck.

In an example embodiment, a lift assist assembly for an anti-nosedive leg is provided. This lift assist assembly includes a counterbalance assembly. The lift assist assembly also includes a cable having a first position and a second position. The first position of the cable is connected to the counterbalance assembly, and the second position of the cable is configured to be connected to the anti-nosedive leg. The counterbalance assembly is configured to generate tension within the cable to generate an upward force on the anti-nosedive leg.

In some embodiments, the lift assist assembly may be configured to reduce a force required by an operator to lift the anti-nosedive leg to fifty pounds or less. In other embodiments, the lift assist assembly may even be configured to reduce the force required by an operator to lift the anti-nosedive leg to ten pounds or less. Additionally, the lift assist assembly may be configured to be attached to a front wall of a trailer in some embodiments. In some embodiments, the lift assist assembly further comprises a fastener, the fastener may be connected to the cable at the second position of the cable, and the fastener may be configured to connect to the anti-nosedive leg.

In some embodiments, the counterbalance assembly may include a rotating tube having at least one torsion spring therein. The first position of the cable may be connected to the counterbalance assembly at the rotating tube, and the torsion spring(s) may be configured to generate a rotational force on the rotating tube that generates tension within the cable. In some related embodiments, the counterbalance assembly may include a rotating tube having at least two torsion springs therein, and the torsion springs may be configured to generate a rotational force on the rotating tube that generates tension within the cable. In other related embodiments, the counterbalance assembly may include a cover that is configured to encase the rotating tube. The cover may define a slot, and the slot may be positioned to permit the cable to extend from the rotating tube downwardly to the anti-nosedive leg. A brush seal may be provided proximate to the slot, and the brush seal may be configured to keep water and/or debris away from components within the counterbalance assembly.

In another example embodiment, a system for providing an easy to lift anti-nosedive leg is provided. The system includes an anti-nosedive leg and a lift assist assembly. The lift assist assembly includes a counterbalance assembly and a cable. The cable has a first position and a second position. The first position of the cable is connected to the counterbalance assembly, and the second position of the cable is connected to the anti-nosedive leg. The counterbalance assembly is configured to generate tension within the cable to generate an upward force on the anti-nosedive leg.

In some embodiments, the lift assist assembly may be configured to reduce a force required by an operator to lift the anti-nosedive leg to fifty pounds or less. In other embodiments, the lift assist assembly may even be configured to reduce the force required by an operator to lift the anti-nosedive leg to ten pounds or less. The lift assist assembly may be configured to be attached to a front wall of a trailer in some embodiments. Additionally, in some embodiments, the lift assist assembly may include a fastener. This fastener may be connected to the cable at the second position of the cable, and the fastener may be connected to the anti-nosedive leg.

In some embodiments, the counterbalance assembly may include a rotating tube having at least one torsion spring therein. The first position of the cable may be connected to the counterbalance assembly at the rotating tube, and the at least one torsion spring may be configured to generate a rotational force on the rotating tube that generates tension within the cable. In some embodiments, the counterbalance assembly may include a rotating tube having at least two torsion springs therein, and the torsion springs may be configured to generate a rotational force on the rotating tube that generates tension within the cable. In some related embodiments, the counterbalance assembly may include a cover that is configured to encase the rotating tube. The cover may define a slot, and the slot may be positioned to permit the cable to extend from the rotating tube downwardly to the anti-nosedive leg. A brush seal may be provided proximate to the slot, and the brush seal may be configured to keep water and/or debris away from components within the counterbalance assembly.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 5B is a perspective view illustrating a rotating tube and a connector that may be used in a lift assist assembly in accordance with an embodiment of the present invention.

DESCRIPTION OF THE PREFERRED EMBODIMENTS

Figure 1:
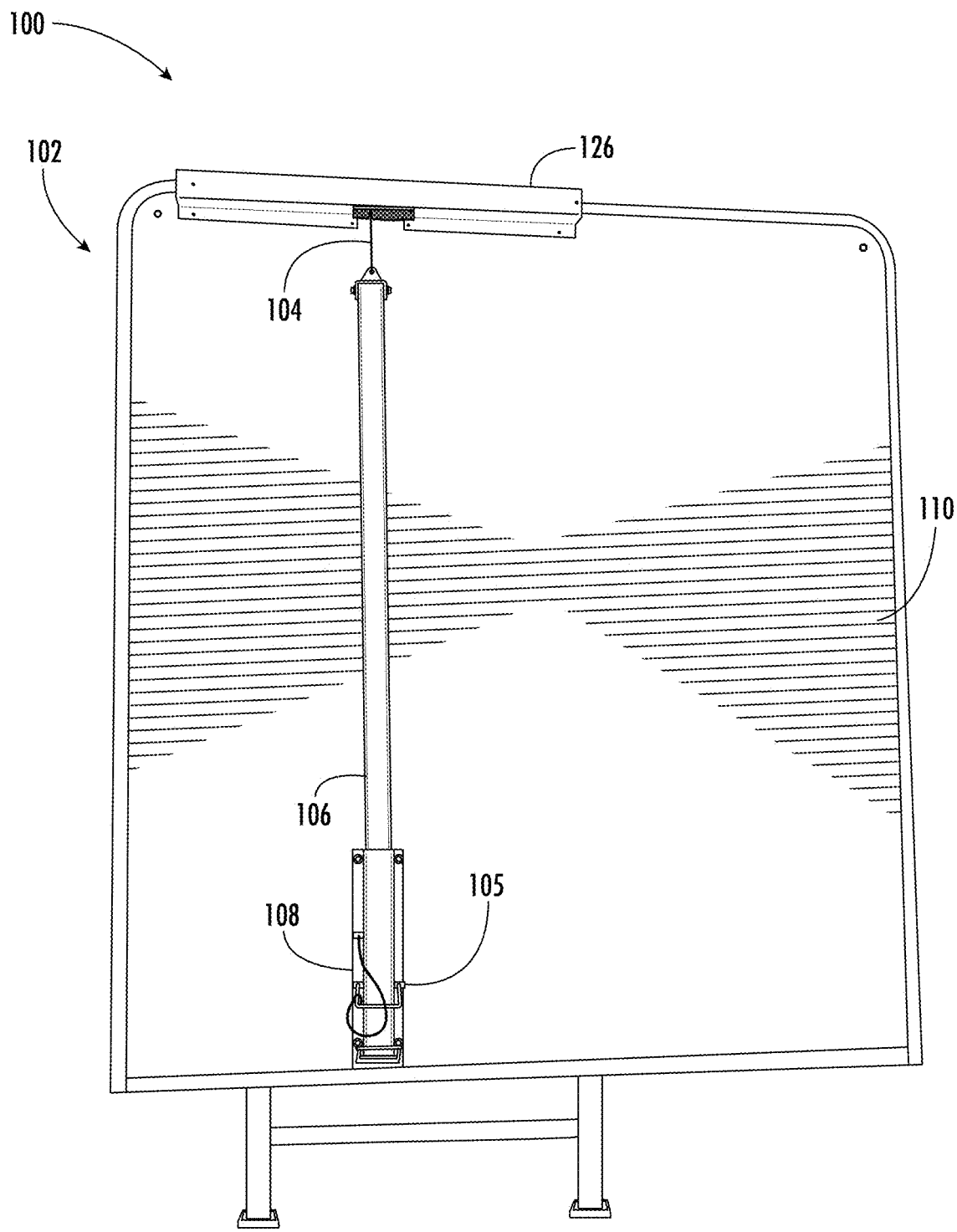
FIG. 1 is a front view illustrating an example lift assist assembly where the anti-nosedive leg is in a raised position in accordance with an embodiment of the present invention.

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Like reference numerals refer to like elements throughout. Statements herein that a component is "connected" to another component are intended to indicate that these components are directly or indirectly attached together unless stated otherwise.

Further, the term "or" as used herein is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used herein should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Figure 2A:
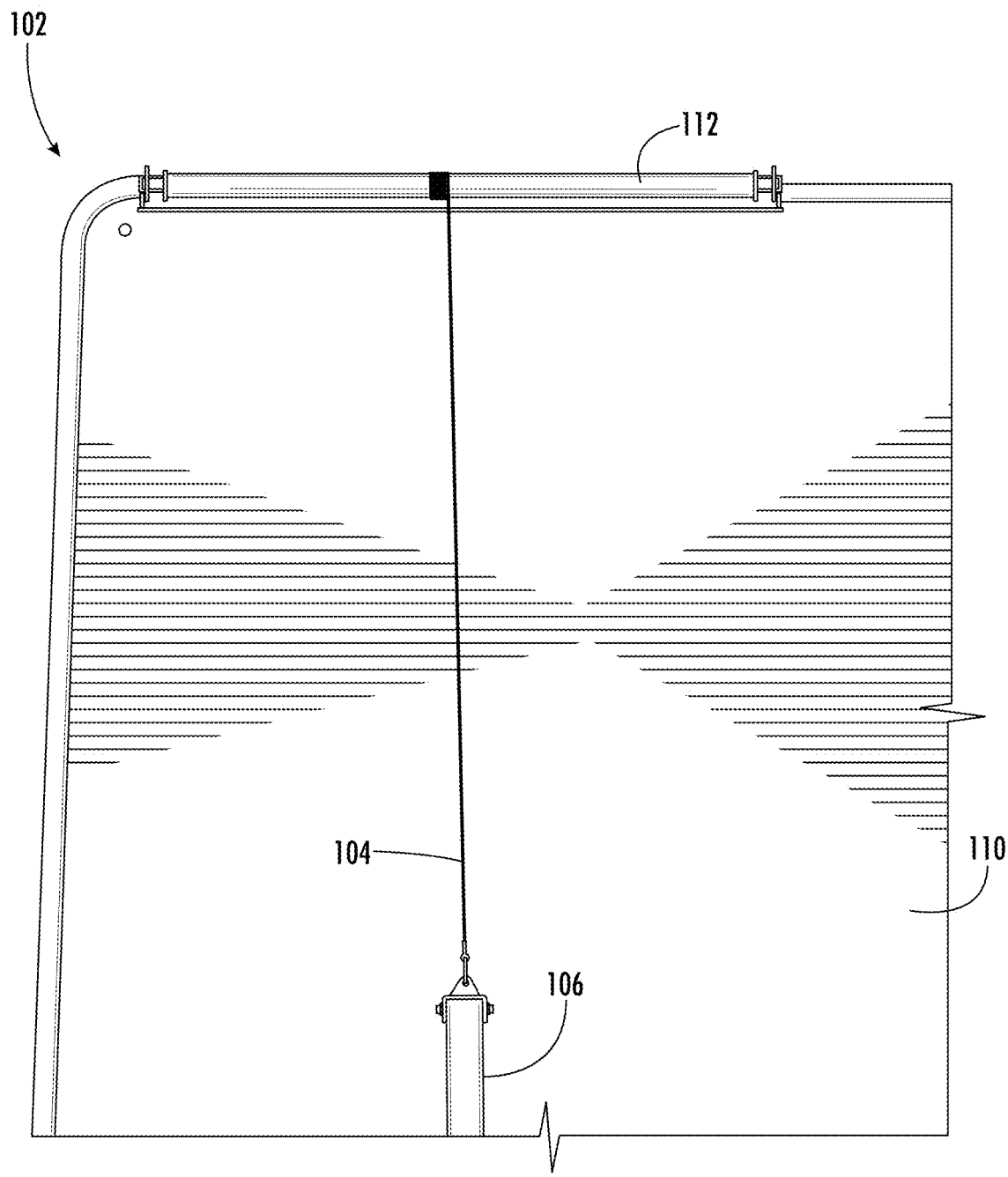
FIG. 2A is a front view illustrating the lift assist assembly of FIG. 1 where the anti-nosedive leg is in a lowered position in accordance with an embodiment of the present invention.
Figure 2B:
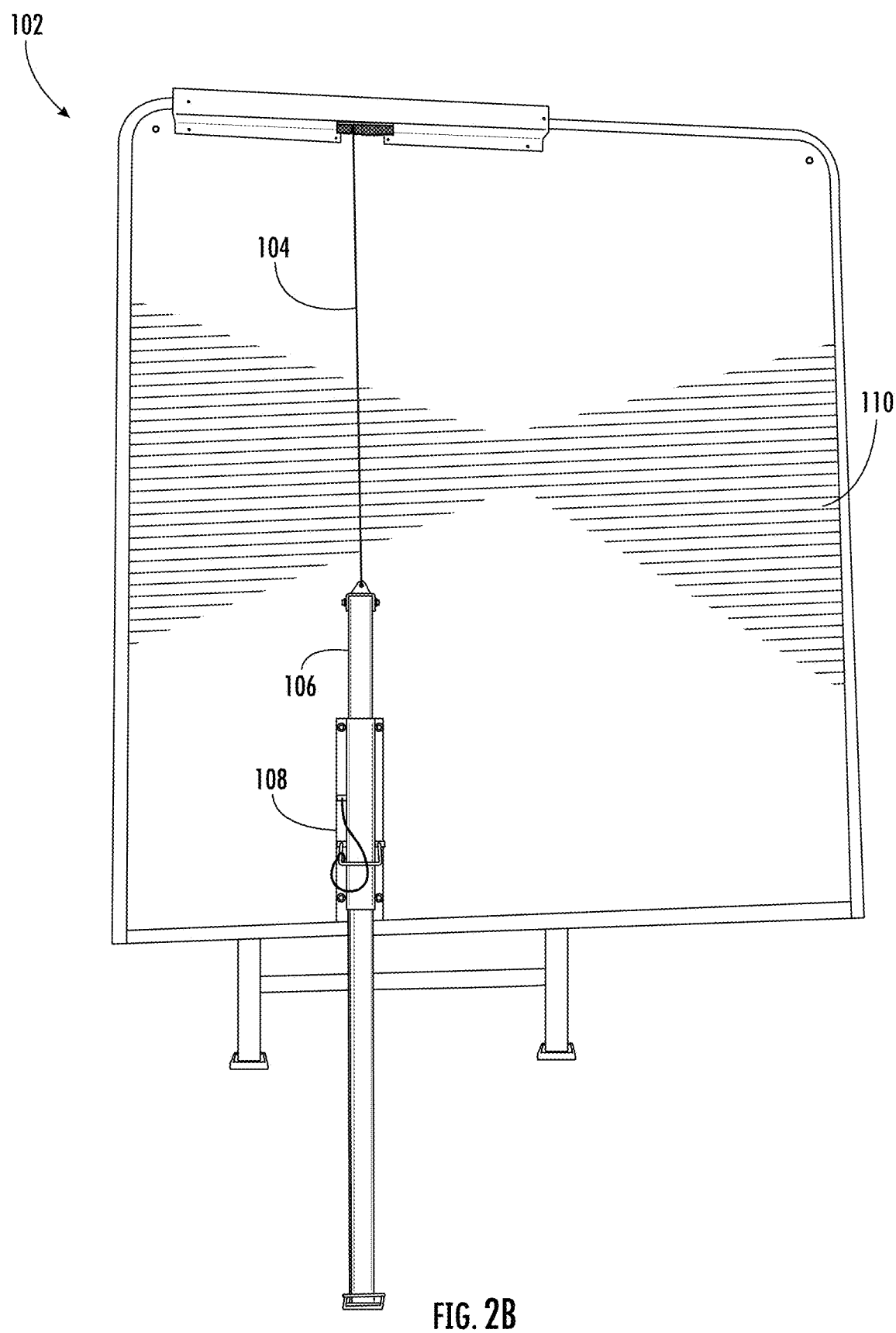
FIG. 2B is another front view illustrating the anti-nosedive leg in a lowered position in accordance with an embodiment of the present invention.

In various embodiments, a lift assist assembly 100 may be provided that may assist in raising an anti-nosedive leg 106. FIG. 1 is a front view illustrating an example lift assist assembly 100 where the anti-nosedive leg 106 is in a raised position. FIG. 2A is a front view illustrating the lift assist assembly 100 of FIG. 1 where the anti-nosedive leg 106 is in a lowered position. Additionally, FIG. 2B illustrates the anti-nosedive leg 106 locked in a lowered position.

As illustrated in FIG. 1, the lift assist assembly 100 may be installed on a front wall 110 of a trailer, and the lift assist assembly 100 may include a counterbalance assembly 102. A cable 104 may be connected to the counterbalance assembly 102. The counterbalance assembly 102 may be configured to generate tension within the cable 104 to generate an upward force on the anti-nosedive leg 106. The counterbalance assembly 102 will be described in greater detail in reference to the subsequent figures. The cable 104 may be in tension and may extend from the counterbalance assembly 102 to a lifting bracket 113 (see FIG. 4) that is connected to the anti-nosedive leg 106. Consequently, the upward force generated by the counterbalance assembly 102 on the cable may be transferred to the anti-nosedive leg 106, making it easier for an operator to raise the anti-nosedive leg 106.

As noted above, the lift assist assembly 100 may cut the force required for lifting the anti-nosedive leg 106 in half. The lift assist assembly 100 may reduce the force required by an operator to lift the anti-nosedive leg 106 to fifty pounds or less. While the upward force generated by the counterbalance assembly 102 may increase the force required for the user to lower the anti-nosedive leg 106, the force required to lower the anti-nosedive leg 106 may still be less than fifty pounds. Thus, a single operator can raise and lower the anti-nosedive leg 106. In some embodiments, the lift assembly 100 may even reduce the force required by an operator to lift the anti-nosedive leg 106 to ten pounds or less.

A guide member 108 may also be secured to the front wall 110 of the trailer. This guide member 108 and the front wall 110 may together define a recess, and the anti-nosedive leg 106 may slide up and down within this recess. A locking bar 105 may also be provided, and this locking bar 105 may extend through a set of holes within the guide member 108 and another set of holes within the anti-nosedive leg 106. In this way, the locking bar 105 may lock the anti-nosedive leg 106 in place relative to the trailer. While the use of this locking bar 105 is an example of an approach for locking the anti-nosedive leg 106 in place, other approaches could be used as well.

Notably, FIG. 1 illustrates the counterbalance assembly 102 with a cover 126, but FIG. 2A illustrates the counterbalance assembly 102 with the cover 126 removed. Thus, some of the internal components of the counterbalance assembly 102 may be seen in FIG. 2A. For example, FIG. 2A illustrates a rotating tube 112 that may be housed within the cover 126. The cable 104 may be wound around the rotating tube 112 in some embodiments. The rotating tube 112 and other internal components within the counterbalance assembly 102 will be described further below.

A cable 104 may be provided that has a first position and a second position. In some embodiments, the first position is a first end of the cable 104 and the second position is a second end of the cable 104. However, the first position and the second position may be provided at other positions between the first end and the second end of the cable 104 in some embodiments. The first position of the cable 104 may be connected to the counterbalance assembly 102, such as at the rotating tube 112 (see FIG. 2A). The second position of the cable 104 may be connected to the anti-nosedive leg 106. Thus, force that is exerted on the cable 104 may be transferred to the anti-nosedive leg 106.

Figure 2C:
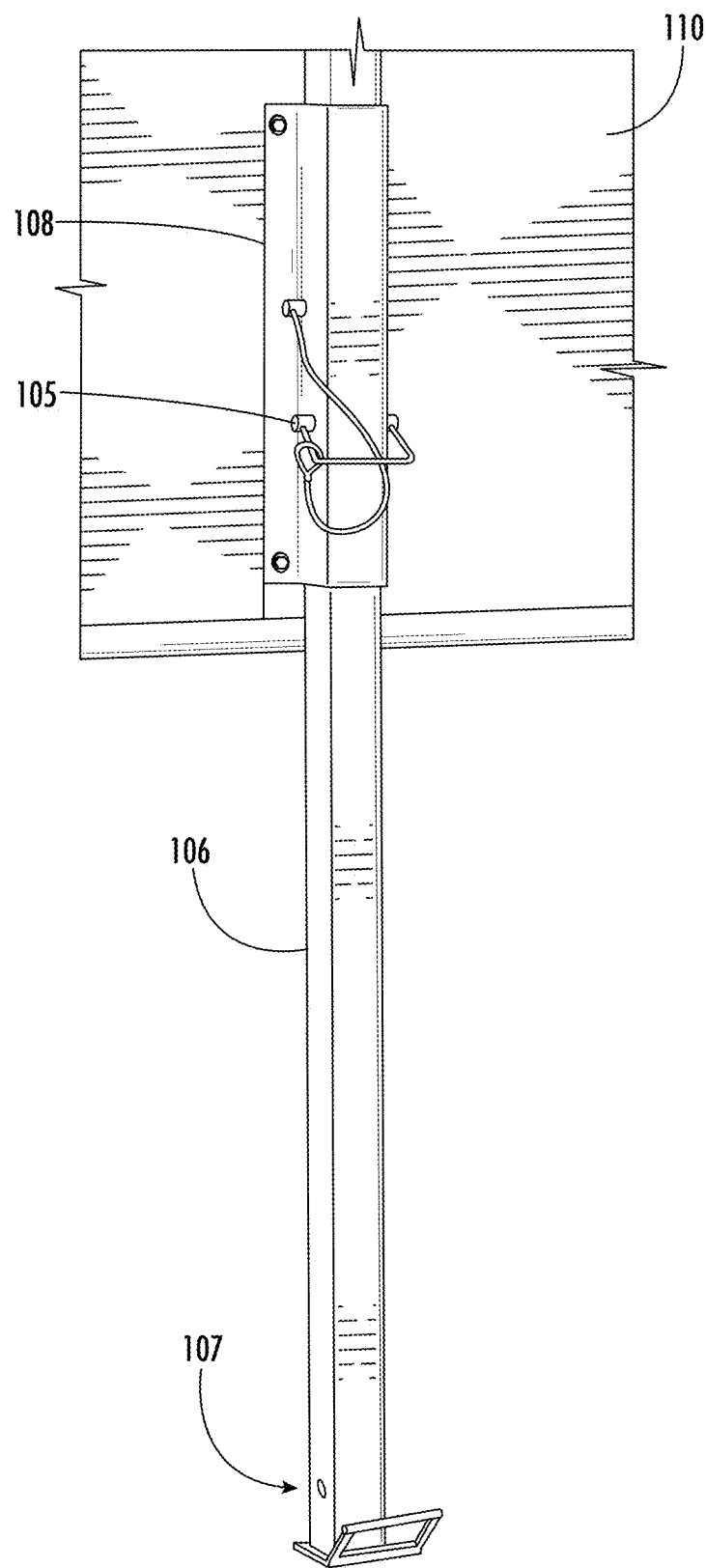
FIG. 2C is an enhanced, perspective view illustrating the anti-nosedive leg locked in a lowered position in accordance with an embodiment of the present invention.

Looking now at FIG. 2C, other features of the anti-nosedive leg 106 may be seen. The anti-nosedive leg 106 may include one or holes 107 where a locking bar 105 may be received. In the illustrated embodiment, the locking bar 105 is secured in a top set of holes within the anti-nosedive leg 106 and within a set of holes within the guide member 108 so that the anti-nosedive leg 106 may be locked in the lowered position. However, the anti-nosedive leg 106 may be locked in a raised position by raising the anti-nosedive leg 106 so that a lower set of holes 107 are aligned with the set of holes within the guide member and by inserting the locking bar 105.

Figure 3:
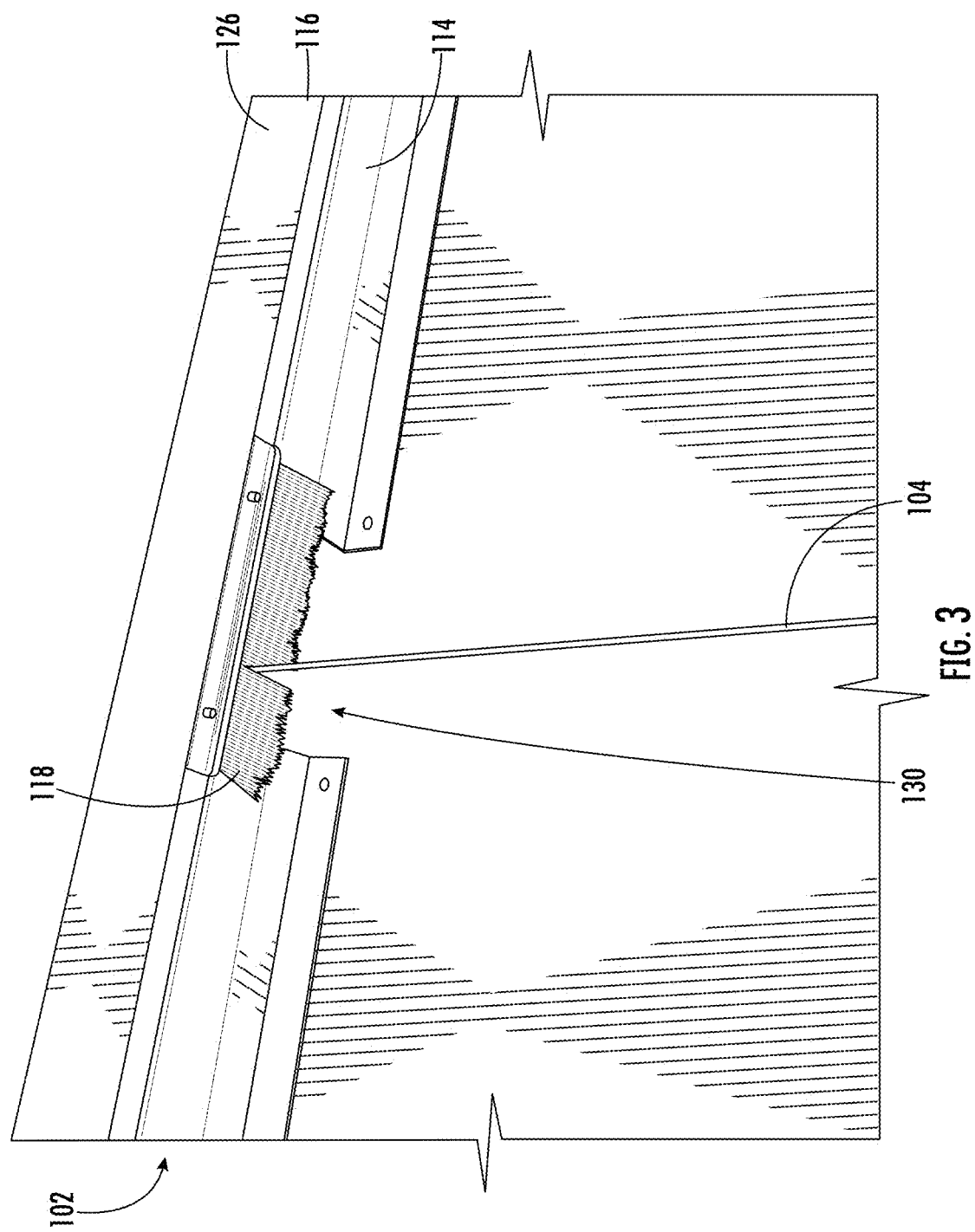
FIG. 3 is a bottom perspective view illustrating the lift assist assembly of FIG. 1 where a cable is extending through a slot in accordance with an embodiment of the present invention.

FIG. 3 is a bottom perspective view illustrating the counterbalance assembly 102 of FIG. 1 where a cable 104 is extending through a slot 130 within the cover 126. As illustrated, the cover 126 may have a first part 114 and a second part 116. The first part 114 may include a bottom face of the cover 126, and the second part 116 may include a front face and a top face of the cover 126. The slot 130 may be defined within the first part 114 in some embodiments so that a cable 104 may extend downwardly and out of the counterbalance assembly 102 so that the cable may be connected to the anti-nosedive leg 106 (see FIG. 1). As illustrated, a brush seal 118 may also be provided on the cover 126, and this brush seal 118 may be provided proximate to the slot 130. This brush seal 118 may be directly connected to the second part 116 of the cover 126 as illustrated in FIG. 3, but the brush seal 118 may be connected to the first part 114 or to another location in other embodiments. The brush seal 118 may be configured to keep water and debris away from the components within the counterbalance assembly 102, such as torsion springs 121 and the rotating tube 112. The cover 126 may be provided to protect the counterbalance assembly 102 from damage and water spray. This cover 126 may comprise aluminum in some embodiments, but other materials may be used.

Figure 4:
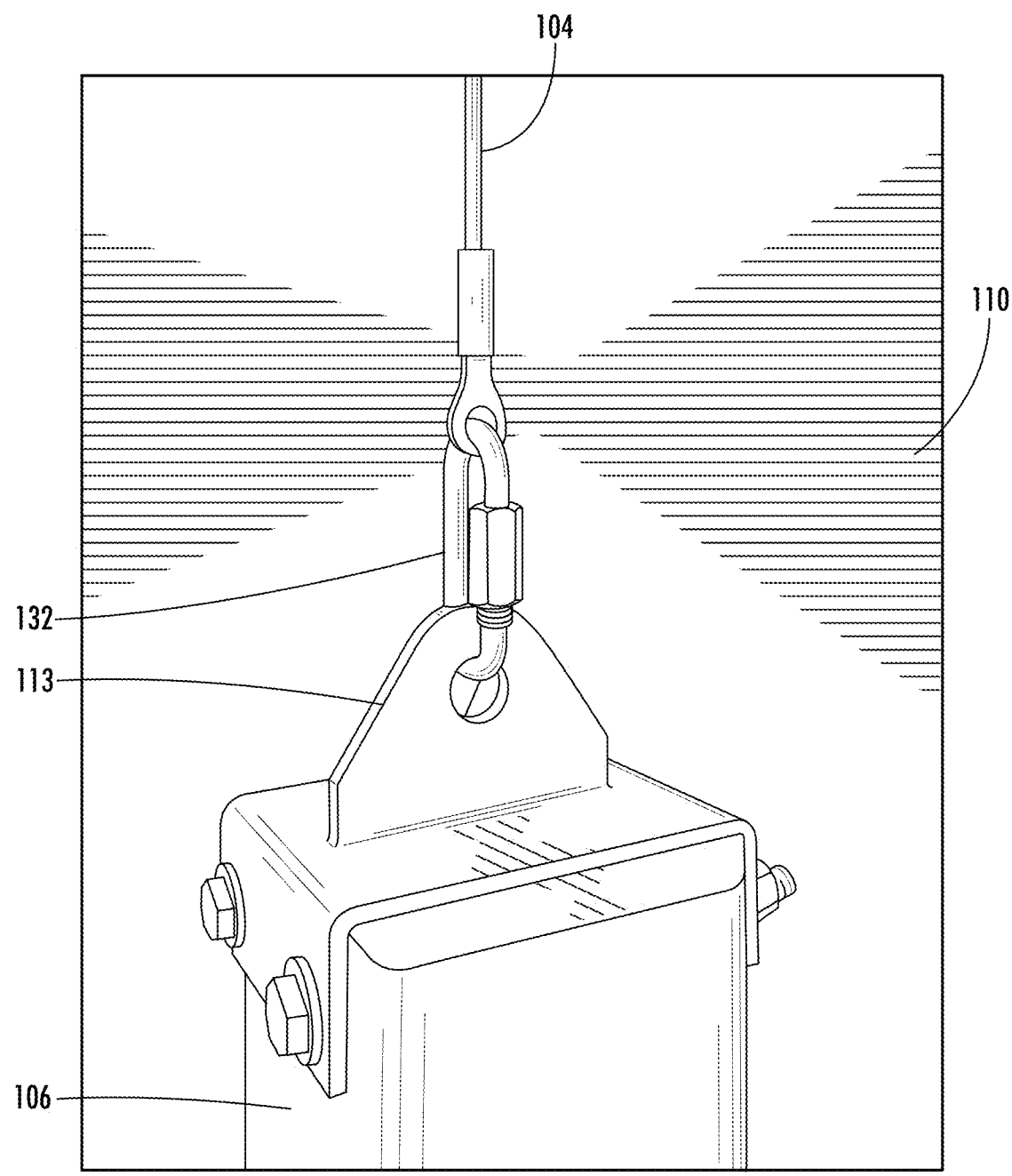
FIG. 4 is a perspective view illustrating the connection between a cable and the anti-nosedive leg in accordance with an embodiment of the present invention.

FIG. 4 is a perspective view illustrating the connection between a cable 104 and the anti-nosedive leg 106. The cable 104 may be connected to a lifting bracket 113 via a fastener 132. The lifting bracket 113 may be connected to an anti-nosedive leg 106 via additional fasteners as illustrated. However, the connections between these components may be accomplished via other approaches. For example, the lifting bracket 113 may be provided as part of the anti-nosedive leg 106 or the lifting bracket 113 may be welded to the anti-nosedive leg 106.

Figure 5A:
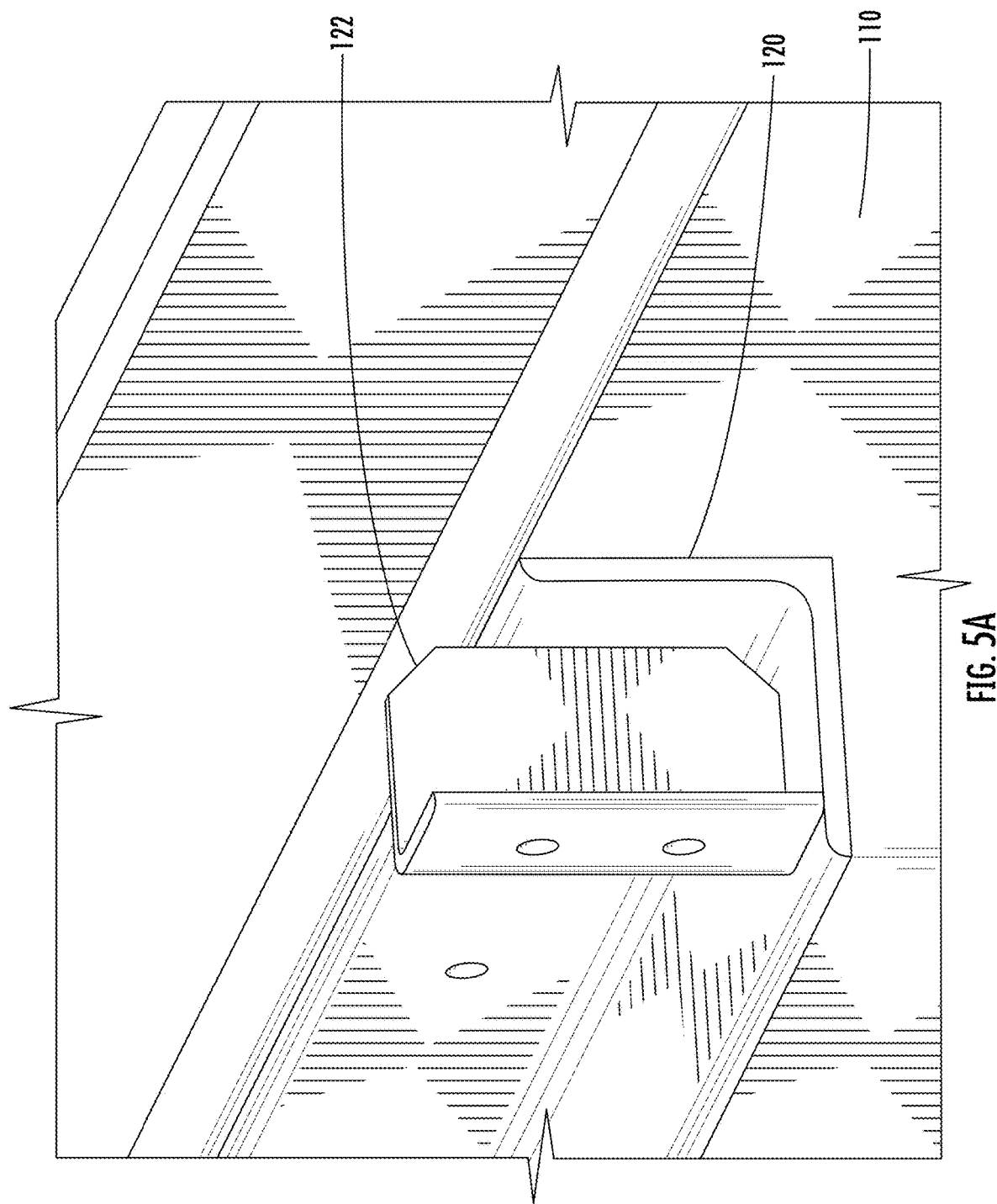
FIG. 5A is a perspective view illustrating an operator angle and a bracket that may be used in a lift assist assembly in accordance with an embodiment of the present invention.
Figure 5C:
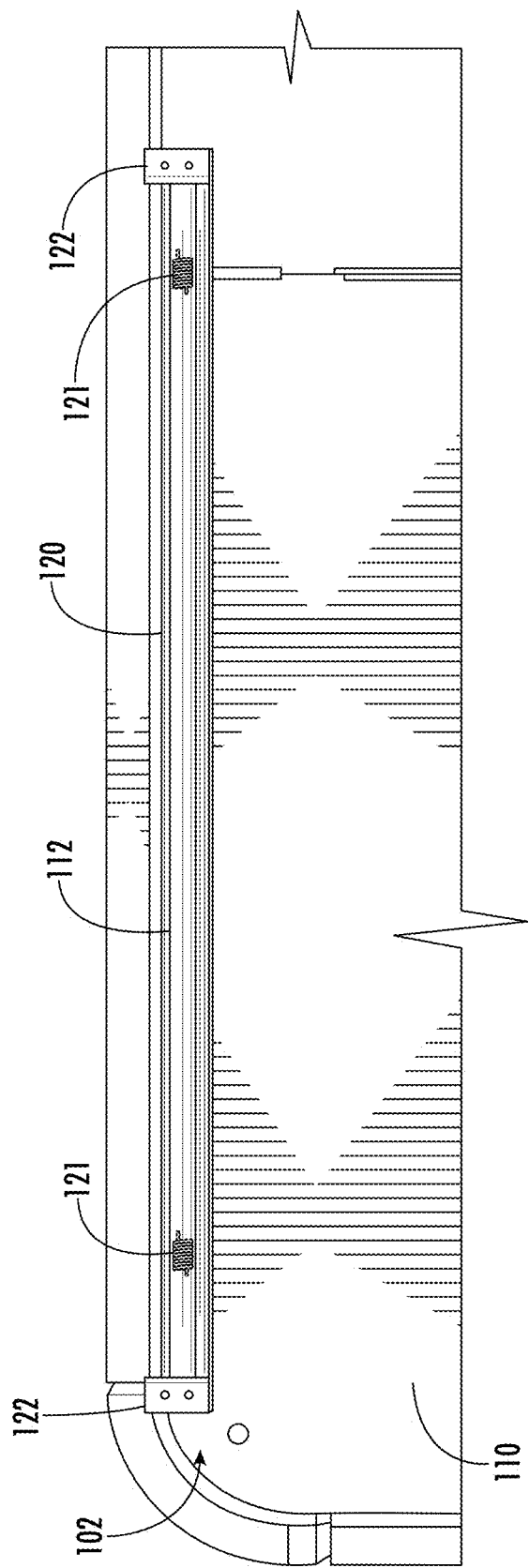
FIG. 5C is a cross-sectional view illustrating the rotating tube of FIG. 5B in accordance with an embodiment of the present invention.

Other features of a counterbalance assembly 102 can be seen more clearly in reference to FIGS. 5A-5C. FIG. 5A is a perspective view illustrating an operator angle 120 and a bracket 122 that may be used in a counterbalance assembly 102. FIG. 5B is a perspective view illustrating a rotating tube 112 and a connector 124 that may be used in a counterbalance assembly 102. FIG. 5C illustrates a cross-sectional view of the counterbalance assembly 102 of FIG. 5A about the line A'-A' depicted in FIG. 5B.

Starting with FIG. 5A, the operator angle 120 may be connected to a front wall 110 of a trailer. Fasteners may be provided that extend through holes within the operator angle 120 so that the fasteners may secure the operator angle to the front wall 110 of the trailer. A bracket 122 may also be provided. This bracket 122 may be used to secure a rotating tube 112 in the counterbalance assembly 102. As illustrated in FIG. 5B, this may be done using a connector 124 that is connected to both the bracket 122 and the rotating tube 122. After the rotating tube 112 is secured in place within the counterbalance assembly 102, the rotating tube 112 may still be permitted to rotate about its central axis.

Looking now at FIG. 5C, additional features of the counterbalance assembly 102 may seen. This figure illustrates a cross-sectional view of the counterbalance assembly 102. As illustrated, the rotating tube 112 may have at least one torsion spring 121 secured on the inside of the rotating tube 112. When the cable 104 is pulled downwardly way from the rotating tube 112, the force generated by the torsion spring(s) 121 may increase, causing an increase in the tension of the cable 104. In some embodiments, multiple torsion springs 121 may be used. For example, in the illustrated embodiment of FIG. 5C, two torsion springs 121 are used, and these torsion springs 121 may be spaced on opposite sides of the counterbalance assembly 102. By using multiple torsion springs 121, the force acting on the cable 104 may be increased so that the anti-nosedive leg 106 may be more easily raised. The use of multiple torsion springs 121 also offers the advantage that if one torsion spring 121 breaks during use, there would still be another torsion spring 121 to relieve some of the force required to lift the anti-nosedive leg 106 until a repair can be made.

Figure 6:
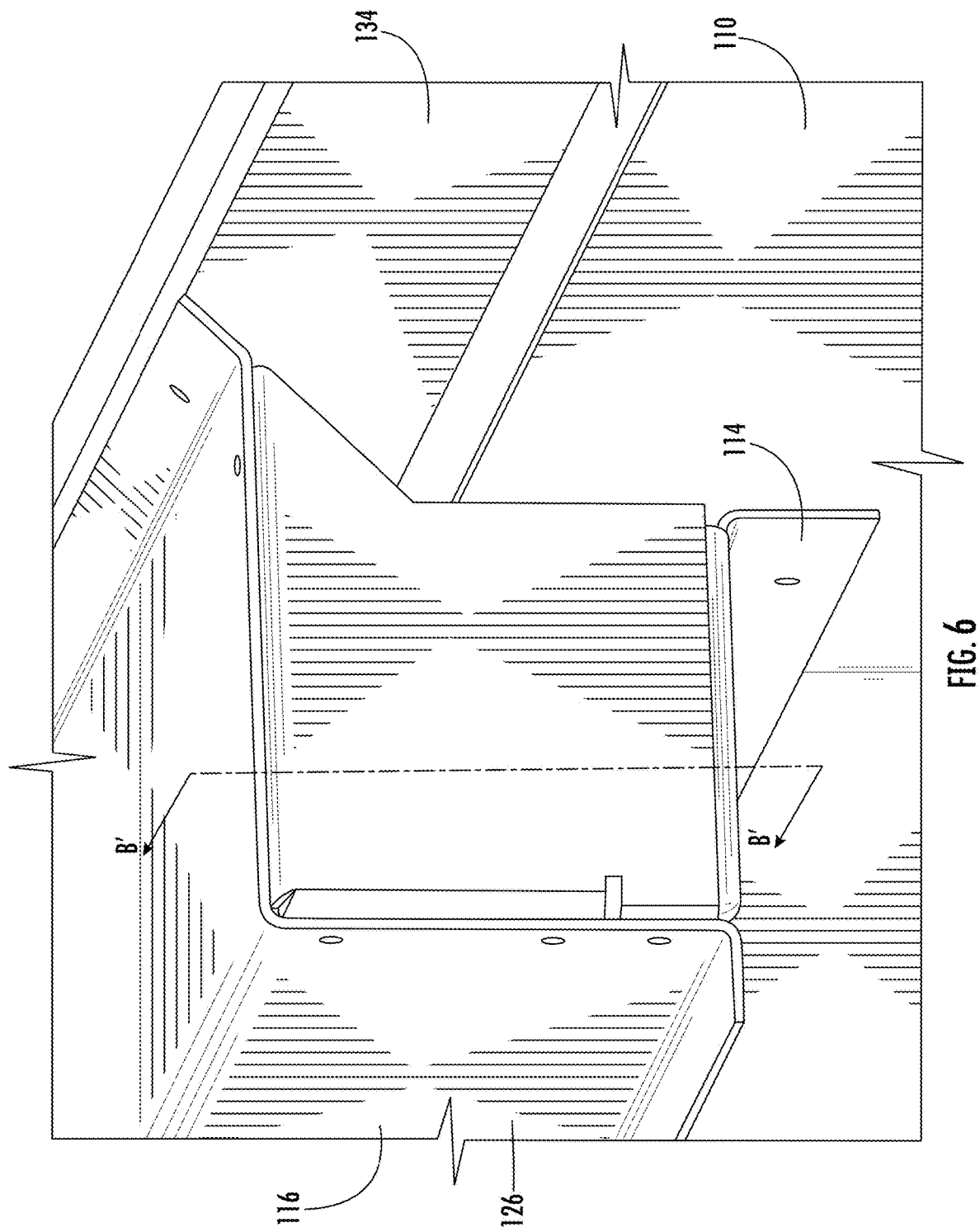
FIG. 6 is a perspective view illustrating a cover that may be used to encase other components in accordance with an embodiment of the present invention.

FIG. 6 is a perspective view illustrating a cover 126 that may be used to encase other components within the counterbalance assembly 102. As noted above, the cover 126 may be configured to protect the counterbalance assembly 102 from damage and/or water spray. As can be seen in FIG. 6, the cover 126 may be attached to the front surface 110 of the trailer as well as an inclined surface 134 of the trailer. However, the cover 126 may also be attached to a top surface of the trailer in some embodiments.

Figure 7:
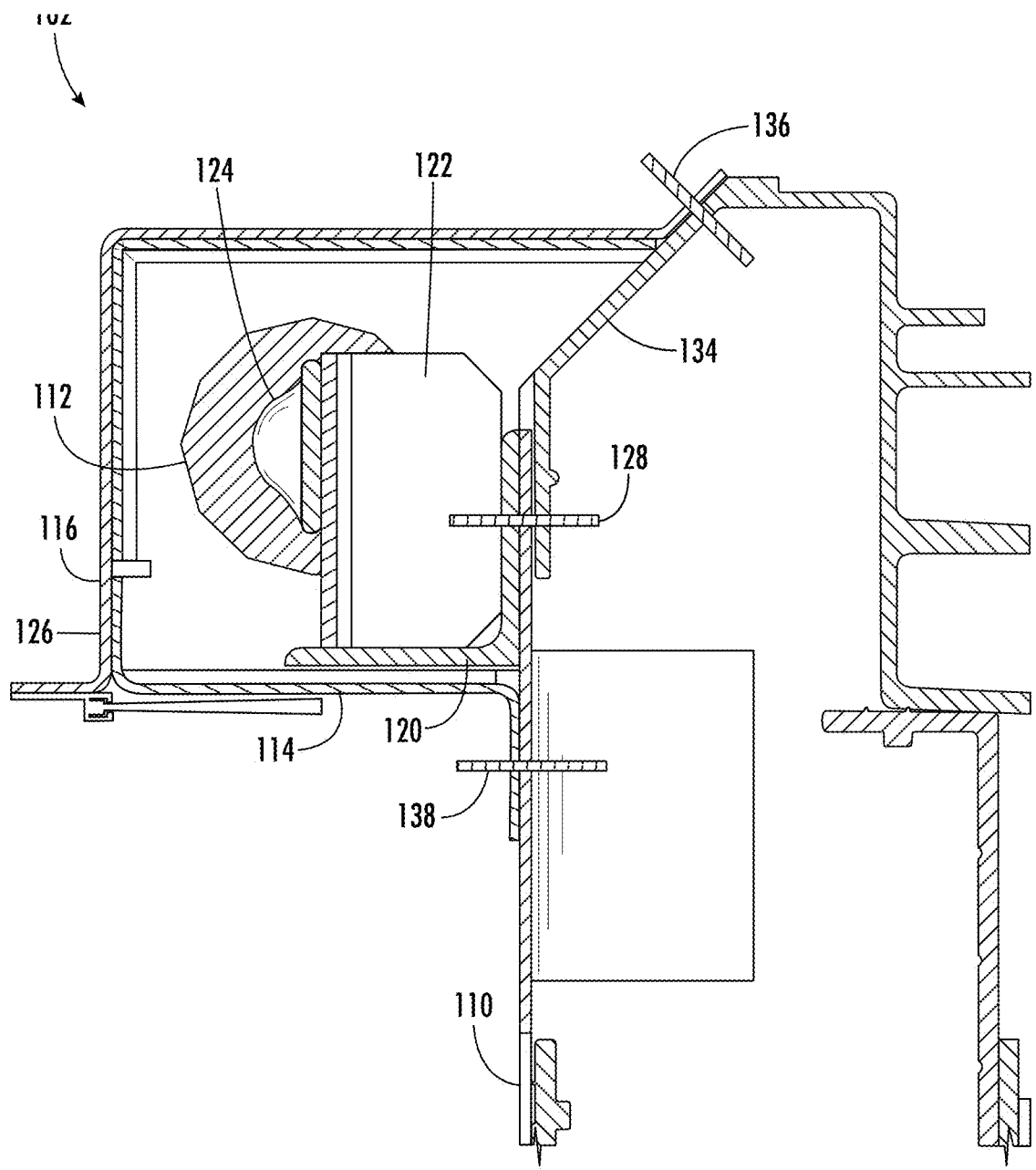
FIG. 7 is a cross-sectional view illustrating various components provided inside the cover in accordance with an embodiment of the present invention.

FIG. 7 is a cross-sectional view illustrating various components provided within the counterbalance assembly 102 about the line B'-B' depicted in FIG. 6. This view permits the rotating tube 112, operator angle 120, the bracket 122, and the connector 124 to be seen. This view also permits the first part 114 and the second part 116 of the cover 126 to be seen. One or more fasteners 128, 138, 136 may be used to secure components of the counterbalance assembly to the trailer. For example, fastener(s) 128 may come in the form of rivets, and the rivets may extend through holes in the operator angle 120 and connect the operator angle 120 to the front wall 110 of the trailer. Additionally, fasteners 138 may extend through holes in the first part 114 of the cover 126 and connect the cover 126 to the front wall 110 of the trailer, and fasteners 136 may extend through holes in the second part 116 of the cover 126 and connect the cover 126 to an inclined wall 134 of the trailer.

It will therefore be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A lift assist assembly for an anti-nosedive leg comprising:
   a counterbalance assembly comprising a rotating tube having at least one torsion spring therein; and
   a cable having a first position and a second position, wherein the first position of the cable is connected to the counterbalance assembly, wherein the second position of the cable is configured to be connected to the anti-nosedive leg, and wherein the counterbalance assembly is configured to generate tension within the cable to generate an upward force on the anti-nosedive leg,
   wherein the first position of the cable is connected to the counterbalance assembly at the rotating tube, and wherein the at least one torsion spring is configured to generate a rotational force on the rotating tube that generates tension within the cable.

2. The lift assist assembly of claim 1, wherein the lift assist assembly is configured to reduce a force required by an operator to lift the anti-nosedive leg to fifty pounds or less.

3. The lift assist assembly of claim 1, wherein the lift assist assembly is configured to reduce the force required by the operator to lift the anti-nosedive leg to ten pounds or less.

4. The lift assist assembly of claim 1, wherein the counterbalance assembly includes a rotating tube having at least two torsion springs therein, wherein the at least two torsion springs are configured to generate a rotational force on the rotating tube that generates tension within the cable.

5. The lift assist assembly of claim 1, wherein the counterbalance assembly includes a cover that is configured to encase the rotating tube.

6. The lift assist assembly of claim 5, wherein the cover defines a slot, wherein the slot is positioned to permit the cable to extend from the rotating tube downwardly to the anti-nosedive leg.

7. The lift assist assembly of claim 5, wherein a brush seal is provided proximate to the slot, wherein the brush seal is configured to keep at least one of water or debris away from components within the counterbalance assembly.

8. The lift assist assembly of claim 1, wherein the lift assist assembly is configured to be attached to a front wall of a trailer.

9. The lift assist assembly of claim 1, further comprising a fastener, wherein the fastener is connected to the cable at the second position of the cable, wherein the fastener is configured to connect to the anti-nosedive leg.

10. A system for providing an easy to lift anti-nosedive leg comprising:
    an anti-nosedive leg;
    a lift assist assembly having:
      a counterbalance assembly comprising a rotating tube having at least one torsion spring therein;
      a cable having a first position and a second position, wherein the first position of the cable is connected to the counterbalance assembly, wherein the second position of the cable is connected to the anti-nosedive leg;
    wherein the counterbalance assembly is configured to generate tension within the cable to generate an upward force on the anti-nosedive leg, the first position of the cable is connected to the counterbalance assembly at the rotating tube, and the at least one torsion spring is configured to generate a rotational force on the rotating tube that generates tension within the cable.

11. The system of claim 10, wherein the lift assist assembly is configured to reduce a force required by an operator to lift the anti-nosedive leg to fifty pounds or less.

12. The system of claim 10, wherein the lift assist assembly is configured to reduce the force required by the operator to lift the anti-nosedive leg to ten pounds or less.

13. The system of claim 10, wherein the counterbalance assembly includes a rotating tube having at least two torsion springs therein, wherein the at least two torsion springs are configured to generate a rotational force on the rotating tube that generates tension within the cable.

14. The system of claim 10, wherein the counterbalance assembly includes a cover that is configured to encase the rotating tube.

15. The system of claim 14, wherein the cover defines a slot, wherein the slot is positioned to permit the cable to extend from the rotating tube downwardly to the anti-nosedive leg.

16. The system of claim 15, wherein a brush seal is provided proximate to the slot, wherein the brush seal is configured to keep at least one of water or debris away from components within the counterbalance assembly.

17. The system of claim 10, wherein the lift assist assembly is configured to be attached to a front wall of a trailer.

18. The system of claim 10, further comprising a fastener, wherein the fastener is connected to the cable at the second position of the cable, wherein the fastener is connected to the anti-nosedive leg.

* * * * *